United States Patent [19]

Tadokoro

[11] 4,338,643

[45] Jul. 6, 1982

[54] MAGNETIC RECORDING DISC AND METHOD OF MAKING SAME

[75] Inventor: Eiichi Tadokoro, Odawara, Japan

[73] Assignee: Fuji Photo Film Co., Ltd., Kanagawa, Japan

[21] Appl. No.: 138,368

[22] Filed: Apr. 8, 1980

Related U.S. Application Data

[63] Continuation-in-part of Ser. No. 6,169, Jan. 24, 1979, abandoned, which is a continuation-in-part of Ser. No. 838,499, Oct. 3, 1977, abandoned.

[30] Foreign Application Priority Data

Nov. 16, 1976 [JP] Japan .................................. 51-137502

[51] Int. Cl.³ .............................................. G11B 5/82
[52] U.S. Cl. ................................................... 360/135
[58] Field of Search ......................... 360/131, 133–135

[56] References Cited

FOREIGN PATENT DOCUMENTS 2124033 12/1971 Fed. Rep. of Germany ...... 360/134
2304311 8/1973 Fed. Rep. of Germany ...... 360/135
2545421 4/1976 Fed. Rep. of Germany ...... 360/131
50-14307 2/1975 Japan ................................... 360/105

Primary Examiner—John H. Wolff

[57] ABSTRACT

In a method of making a magnetic recording sheet, a magnetic material is applied on a web in a layer consisting of a number of contiguous first strip-like zones and second strip-like zones which are alternately arranged in parallel to each other. The ratio of the width of the first strip-like zone to that of the second strip-like zone is within a range of 1:3 to 3:1. In the first strip-like zones having a width of not more than 5 mm the magnetic particles are oriented in a first direction, and in the second strip-like zones magnetic particles are oriented in a second direction which is inclined with respect to the first direction at an angle from 60° to 120°. With this particular orientation of the magnetic particles in the magnetic layer when the magnetic layer is applied on a web, the orientation of the magnetic particles become almost random while the magnetic layer is hardened. The magnetic recording disc thus prepared has a very low output fluctuation and a higher output level.

10 Claims, 7 Drawing Figures

MAGNETIC RECORDING DISC AND METHOD OF MAKING SAME

This application is a continuation-in-part of application Ser. No. 006,169, filed Jan. 24, 1979 which in turn is a continuation-in-part of application Ser. No. 838,499, filed Oct. 3, 1977, both now abandoned.

BACKGROUND OF THE INVENTION

1. Field of the Invention

This invention relates to a magnetic recording sheet, such as a magnetic recording disc or the like, and a method making such a sheet.

2. Description of the Prior Art

As is well known, a magnetic recording sheet comprises a flexible film base coated with a magnetic layer and is generally of a circular shape with a center opening for engagement with a rotatable member of a driving means. The magnetic layer generally contains a plurality of individual magnetic particles such as r-$Fe_2O_3$. Signals are recorded on the magnetic layer of the magnetic recording sheet along concentric circles or a spiral line. Accordingly, the magnetic particles carried on the magnetic recording sheet are preferably oriented in concentric circles for the sake of lowering output fluctuation and obtaining a higher output level.

In manufacturing such a circular magnetic recording sheet, the magnetic particles are applied to a continuous web of the support film base in a coating mixed with a binder substance and then the individual circular magnetic recording sheets are stamped out from the continuous web after the coating is solidified. As is well known in the art, the particle orientation must be fixed before the coating is solidified and, consequently, before stamping out the magnetic recording sheets.

Therefore, if the magnetic particles are oriented along concentric circles, the center of the individual sheets must be made to coincide with the common center of the concentric circles when the circular magnetic recording sheet is being stamped out. This requirement entails manufacturing difficulties and limits the possibility of mass production of circular magnetic recording sheets with a concentric magnetic particle orientation. In fact, it is impossible to massproduce such magnetic recording sheets.

Various methods have been proposed for producing magnetic recording sheets having unique particle orientations which can be mass-produced more easily, while at the same time lowering output fluctuation and obtaining a higher output level.

For example, in Japanese Patent Public Disclosure No. 14307/1975, there is disclosed a magnetic recording sheet in which the magnetic layer consists of three zones which are arranged in parallel in the direction parallel to a diameter of the sheet. The intermediate zone interposed between the other two zones is twice as wide as one of the other two zones and includes the center of the magnetic recording sheet at the center of its width.

In the intermediate zone, the magnetic particles are oriented in the longitudinal direction of the zone, and in the other two zones, the magnetic particles are oriented in the direction substantially perpendicular to the longitudinal direction of the zone.

When producing this type of magnetic recording sheet, a coating including magnetic particles mixed with a binder substance is applied to a continuous web of the support film base along its longitudinal direction. The magnetic particles included in the intermediate zone of the web are oriented in the longitudinal direction of the web, and the magnetic particles included in opposite sides zone of the web are oriented in the direction perpendicular to the longitudinal direction of the web. Then individual sheets are stamped out from the web in such a manner that the center of the sheet coincides with the longitudinal axis of the web of the intermediate zone.

It is apparent that the magnetic recording sheet of this type is more suitable for mass production than that having a concentric particle orientation, since the center of the sheet is only required to coincide with the longitudinal axis of the web. However, not only is it still rather difficult to mass-produce this type of magnetic recording sheet, but the output fluctuation thereof is also much larger than that of the magnetic recording sheet having a concentric particle orientation.

In more detail, in accordance with the magnetic recording sheet of the above described type as disclosed in Japanese Patent Public Disclosure No. 14307/1975, the output fluctuation which has been as large as 3dB can be reduced to about 1.0dB. This level of output fluctuation is still desired to be much more reduced.

SUMMARY OF THE INVENTION

In light of the foregoing observations and the description, the primary object of the present invention is to provide a magnetic recording sheet which is easy to massproduce and has a very low output fluctuation.

Another object of the present invention is to provide a method of making a magnetic recording sheet which is easily able to make a magnetic recording sheet having a low output fluctuation as low as 0.25 dB.

In the method of making a magnetic recording sheet in accordance with the present invention, a magnetic material is applied on a web in a layer consisting of a number of contiguous first and second strip-like zones and which are alternately arranged in parallel to each other. In the first strip-like zones magnetic particles are oriented in a first direction, and in the second strip-like zones magnetic particles are oriented in a second direction inclined with respect to the first direction at an angle from 60° to 120°.

The width of each zone is limited to no more than 5 mm, and the ratio of the width of the first strip-like zone to that of the second strip-like zone is limited to a range of 1:3 to 3:1. With this arrangement of the magnetic layer when the magnetic layer is applied on a web, the orientation of the magnetic particles become almost random while the magnetic layer is hardened. The output fluctuation of the magnetic recording sheet thus obtained is much lowered down to about 0.25 dB which is about one fourth the level obtained by the above Japanese Patent Public Disclosure and less than one tenth the level of the conventional magnetic recording disc having no special arrangement of the magnetic particle orientation in the magnetic layer. Further with this arrangement of the magnetic layer, the center of the magnetic recording sheet need not even coincide with the longitudinal axis of the web when the magnetic recording sheet is being stamped from the web. Therefore, the magnetic recording sheet of this invention can be mass-produced more easily. Furthermore, based on this feature it is possible to easily stamp out from a large web different size of magnetic recording sheets having the same performance.

DESCRIPTION OF THE PREFERRED EMBODIMENTS

Figure 1:
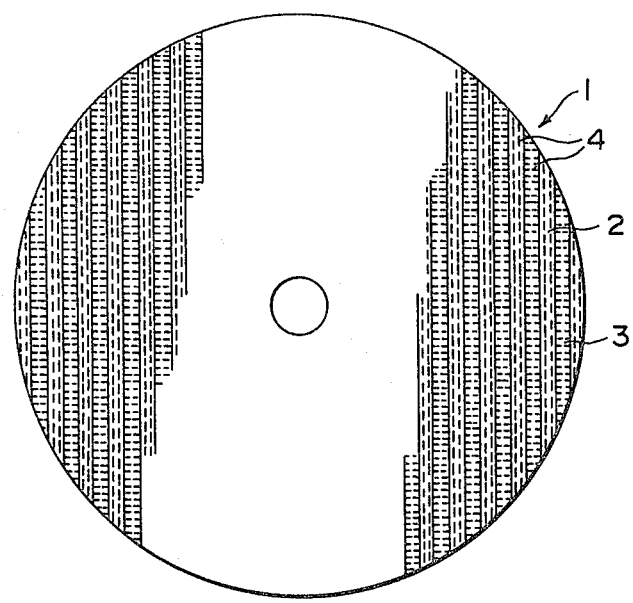
FIG. 1 is a plan view of a magnetic recording sheet at a stage where a magnetic material is applied in accordance with the method of an embodiment of the present invention, in which the particle orientation of the magnetic layer applied is shown diagramatically.
Figure 2:
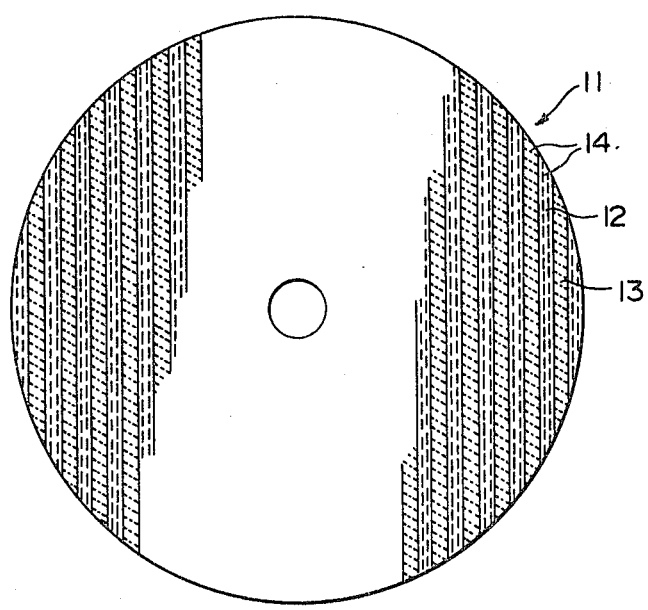
FIG. 2 is a plan view similar to FIG. 1 of a magnetic recording sheet at a stage where a magnetic material is applied in accordance with the method of another embodiment of the present invention.

FIGS. 1 and 2 respectively show particle orientations in a magnetic layer applied on a web while the layer is not dried in accordance with embodiments of the present invention. Though the web is not cut into the disc shape until the magnetic layer coating is solidified and the orientations of the magnetic particles are changed to random as explained hereinafter, FIGS. 1 and 2 illustrate the disc shaped sheet with the magnetic particles oriented as they are before the layer coating is solidified is dried for the sake of explanation.

In the embodiment shown in FIG. 1, the magnetic layer of a magnetic recording sheet 1 consists of a number of first strip-like zones 2 and a number of second strip-like zones 3. The contiguous first and second strip-like zones 2 and 3 are alternately arranged in parallel to each other. In the first strip-like zones 2, magnetic particles 4 are oriented in the longitudinal direction of the zone, and in the second strip-like zones 3, the magnetic particles 4 are oriented in the direction substantially perpendicular to the longitudinal direction of the zone. Accordingly, the magnetic particles in the two zones are oriented in different directions perpendicular to each other.

The angle between the two directions is preferably 90°. However, it may vary within a range between 60° to 120°.

In the magnetic recording sheet 11 shown in FIG. 2, the magnetic particles 14 are oriented in the longitudinal direction of the zone within the first strip-like zones 12 and are oriented in a direction inclined at about 60° with respect to the longitudinal direction of the zone within the second strip-like zones 13. Accordingly, the magnetic particles in each zone are respectively oriented in two directions inclined with respect to each other at 60°.

Figure 5:
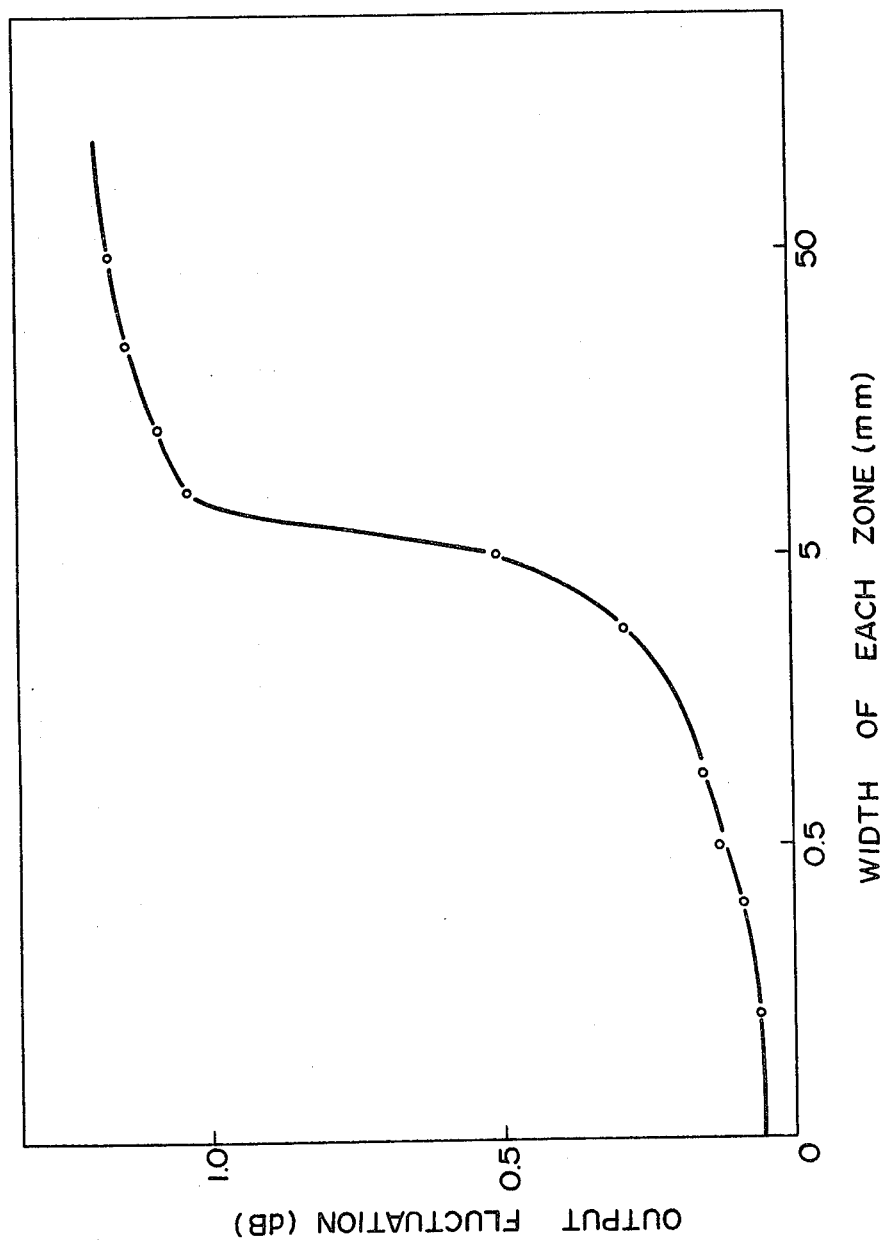
FIG. 5 is a diagram showing the relationship between the width of the strip-like zone and the output fluctuation of the magnetic recording sheet.

The width of each strip-like zone constitutes an important aspect of the invention. FIG. 5 shows the relation between the width of each strip-like zone and the output fluctuation of the magnetic recording sheet. As will be apparent from FIG. 5, the output fluctuation is very much lowered when the width of each zone is not more than 5 mm, especially when not more than 3 mm. Therefore, the width of the zone is limited to not more than 5 mm, and preferably is not more than 3 mm.

In this respect, the previously mentioned magnetic sheet disclosed in Japanese Patent Public Disclosure No. 14307/1975 is disadvantageous inasmuch as the width of the zone is much larger than 5 mm. More specifically, a magnetic recording sheet generally has a diameter of about 50 mm to 100 mm, and the magnetic layer of the magnetic sheet in accordance with Japanese Patent Public Disclosure No. 14307/1975 consists of three zones as mentioned above. Accordingly, one of the three zones should have a width of about 10 mm to 30 mm.

Figure 7:
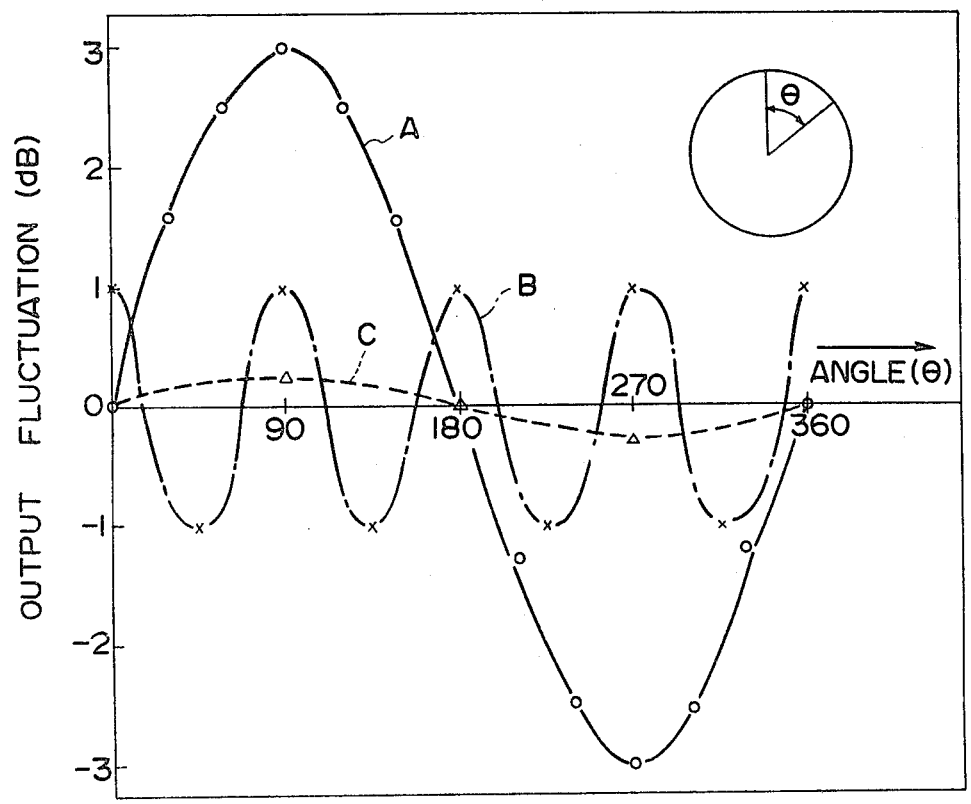
FIG. 7 is a graph showing the output fluctuation of the magnetic recording sheet obtained in accordance with the present invention in comparison with that of the conventional magnetic recording sheets.

FIG. 7 shows the output fluctuation of the different type of the magnetic sheet in which Curve-A represents the output fluctuation of the conventional magnetic disc in which the magnetic particles are all oriented in one direction, Curve-B represents the output fluctuation of the magnetic disc as shown in Japanese Patent Public Disclosure No. 14307/1975, and Curve-C represents the output fluctuation of the magnetic disc obtained by this invention. As shown in FIG. 7, the output fluctuation is much reduced down to about 0.25 dB in accordance with this invention whereas in said prior art the output fluctuation is about 1 dB.

Furthermore, the ratio of the width of the first and second strip-like zones is limited to a range of 1:3 to 3:1 and whereas a range from 1:2 to 2:1 is preferable for obtaining a uniform output level over the entire circumference.

Now a method of producing a magnetic recording sheet 1 shown in FIG. 1 will be described by referring to FIGS. 3 to 6.

Figure 3:
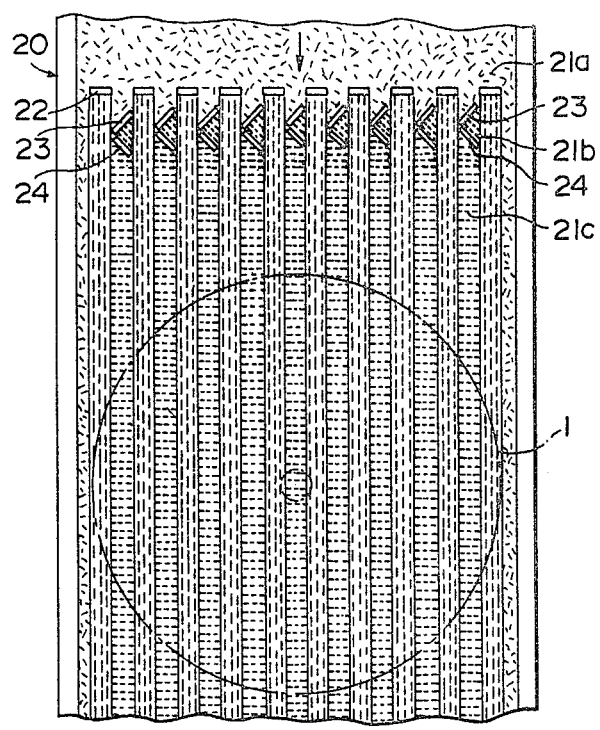
FIGS. 3 and 4 are fragmental plan views for illustrating a method of making magnetic recording sheets shown in FIGS. 1 and 2, respectively.

As shown in FIG. 3, magnetic particles are applied to a web 20 which is constituted of flexible support film base. The application is in the form of a coating comprised of the magnetic particles mixed with a binder substance and is conducted while the web is fed in its longitudinal direction as shown by an arrow. This method of application is well known in the art. At this time, the magnetic particles are directed in random directions as designated by numeral 21a. Then the magnetic particles are oriented in the above mentioned desired directions before the coating is solidified. The particle orientation is achieved by passing the web close to a particle orienting station which consists of a plurality of bar magnets.

The strip-like zones corresponding to the first strip-like zones 2 of FIG. 1 in which magnetic particles are oriented in the longitudinal direction of the zone are formed by bar magnets 22 extending in the transverse direction of the web and spaced apart from each other in a straight line.

The strip-like zones corresponding to the second strip-like zones 3 of FIG. 1 in which magnetic particles are oriented in the direction perpendicular to the longitudinal direction of the zone are formed by plural pairs of bar magnets 23 and 24. Each pair of bar magnets 23 and 24 is located between said two adjacent bar magnets 22. The bar magnet 23 is inclined at 45° with respect to the longitudinal axis of the web, and the bar magnet 24 is perpendicular to the bar magnet 23. The magnet particles are first oriented in the direction inclined at 45° with respect to the longitudinal direction of the web as designated by numeral 21b when the web is passed close to magnet 23. Then the magnetic particles are further oriented in the direction perpendicular to the longitudinal direction of the web as designated by numeral 21c when the web is passed close to the magnet 24.

Figure 4:
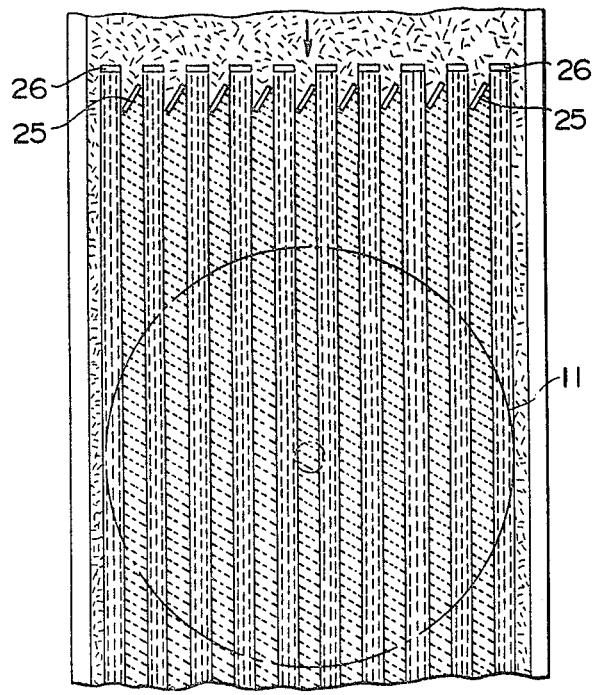

As shown in FIG. 4, the magnetic recording layer can be applied on the web in a similar manner. The second strip-like zones 13 of FIG. 2 in which the magnetic particles are oriented in the direction inclined at 60° with respect to the longitudinal direction of the zone are formed by bar magnets 25 disposed between bar magnets 26 for the first strip-like zone 12 of FIG. 2 and inclined at 60° with respect to the longitudinal direction of the web.

Figure 6:
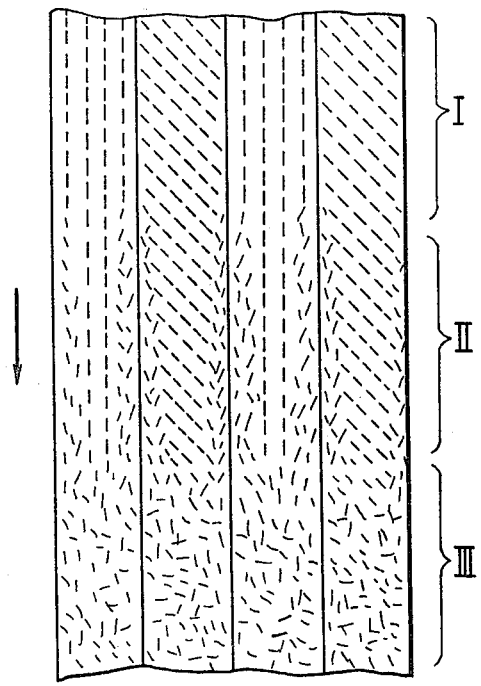
FIG. 6 is an enlarged view showing how the orientation of the magnetic particles changes as the time goes after application of the magnetic material on a web.

After the magnetic recording layer is applied on the web and the magnetic particles are oriented in the desired directions as shown in FIGS. 3 and 4, the magnetic particles in the adjacent zones interact with each other at the boundaries of the zones as the time goes and the orientation of the particles becomes nearly random as shown in FIG. 6 before the magnetic coating layer is solidified.

Thereafter, the individual magnetic recording sheet is stamped out from the processed web as indicated at 1 and 11 in FIGS. 3 and 4.

Since the orientation of the magnetic particles is almost made random, the output fluctuation of the magnetic disc stamped out therefrom is made very small.

Now the present invention will be described in more detail with reference to an example.

EXAMPLE

A solution of the following contents was applied on a film base of polyethylene telephthalate having a thickness of 22μ by a doctor blade coating method in a thickness of 7μ at a rate of 60 m/min.

| | |
|---|---|
| magnetic material (γ-Fe$_2$O$_3$, size:0.04μφ × 0.24μ | 300 parts (by weight) |
| vinylchloride/vinylacetate copolymer (copolymerization rate 87:13 polymerization degree 380) | 32 parts |
| polyester, polyurethane (reaction product of polyester having a terminal hydroxyl group consisting of butanediol and adipic acid, and 2,4-diphenylmethane diisocyanate, molecular weight: about 40000) | 18 parts |
| carbon black (mean grain size 2μ) | 20 parts |
| silicone oil (dimethyl polysiloxane) | 0.8 parts |
| chromium oxide (Cr$_2$O$_3$, mean grain size 5μ) | 12 parts |
| isocyanate compound (ethylacetate 75% solution of reaction product of 3mol of 2,4-tolylenediisocyanate compound and 1mol of trimethylolpropane) | 10 parts |
| methyl ethyl ketone | 450 parts |
| butylacetate | 150 parts |

In the above mentioned coating process, samarium cobalt magnets having 8000 gauss of Br were arranged to make stripes alternately oriented in perpendicular to each other between adjacent stripes as shown in FIG. 3.

The width of the first and second stripes was determined as shown in Table 1.

The sheet thus obtained was punched into a doughnut shape having a diameter of 150 mm and set on a sheet recorder. Then, the sheet was rotated at a speed of 3600 rpm and a signal of 4 MHz was recorded at a position 50 mm apart from the center. The recorded signal was reproduced and fluctuation in the reproduced output (dB) was measured. The measured results were as shown in Table 1, in which $$dB = 20\log \frac{SA}{SB},$$

where SA is the maximum output in one rotation and SB is the minimum output in one rotation.

TABLE 1

| Test No. | Width of Stripes (mm) First str. | Second str. | Measured value (dB) |
|---|---|---|---|
| 1 | 0.2 mm | 0.2 mm | 0.50dB or less |
| 2 | 0.2 | 0.4 | 0.20 |
| 3 | 0.2 | 0.6 | 0.30 |
| 4 | 0.2 | 1.0 | 0.50 |
| 5 | 0.4 | 0.4 | 0.07 |
| 6 | 0.4 | 0.8 | 0.20 |
| 7 | 0.4 | 1.2 | 0.55 |
| 8 | 0.4 | 1.6 | 0.80 |
| 9 | 0.5 | 0.5 | 0.10 |
| 10 | 0.5 | 1.0 | 0.20 |
| 11 | 0.5 | 1.5 | 0.40 |
| 12 | 0.5 | 2.0 | 0.60 |
| 13 | 1.0 | 1.0 | 0.20 |
| 14 | 1.0 | 2.0 | 0.25 |
| 15 | 1.0 | 3.0 | 0.40 |
| 16 | 1.0 | 4.0 | 0.60 |
| 17 | 4.0 | 4.0 | 0.40 |
| 18 | 4.0 | 8.0 | 0.45 |
| 19 | 4.0 | 12.0 | 0.50 |
| 20 | 4.0 | 16.0 | 0.70 |
| 21 | 5.0 | 5.0 | 0.50 |
| 22 | 5.0 | 10.0 | 0.80 |
| 23 | 5.0 | 15.0 | 0.90 |
| 24 | 5.0 | 20.0 | 1.30 |
| 25 | 7.0 | 7.0 | 1.20 |
| 26 | 7.0 | 14.0 | 1.80 |
| 27 | 7.0 | 21.0 | 1.80 |
| 28 | 7.0 | 28.0 | 1.80 |

Now an example of data showing the results obtained in accordance with the prior art will be described for comparison with the above example of the present invention.

COMPARISON TEST

Using the same solution as that used in the above Example, the magnetic field orientation was conducted by the method as disclosed in Japanese Patent Public Disclosure No. 14307/1975. The method as shown in FIG. 7 of the prior publication was employed. The size of the sheet was 150 mm which was the same as that of the sheet used in the above Example. The width of the stripes were 75 mm both in the first and second stripes. Samarium-cobalt magnets having 8000 gauss of Br were used. The sheet thus obtained was tested in the same manner as described above in the Example. The fluctuation in the reproduced output (dB) was in the range of about 1.5 to 2 dB, which was much larger than that resulting in the present invention as shown in Table 1 under the condition of 5 mm or less of the width of the first stripe and 3 or less of the ratio of the second stripe width to the first stripe width. Further, the fluctuation in the reproduced output at the position of about 38 mm apart from the center of the sheet was about 6 dB.

From the results as mentioned hereinabove, it can be said that the output fluctuation of the magnetic sheet is markedly lowered by the present invention in which the ratio of the width of the first strip-like zone to that of the second strip-like zone is limited to 1:3 to 3:1, and the width of the first strip-like zone is not more than 5 mm.

I claim:

1. A method of producing a magnetic recording disc comprising applying a magnetic layer containing magnetic particles on a support film base, orienting the magnetic particles in a number of first strip-like zones in a first direction and in a number of second strip-like zones in a second direction inclined with respect to the first direction at an angle of 60° to 120°, said first and second strip-like zones being alternately and contiguously arranged in parallel to each other, the width of each said first and second strip-like zones being not more than 5 mm and the ratio of the width of the first strip-like zone to that of the second strip-like zone being within the range of 1:3 to 3:1, solidifying the magnetic layer after the magnetic particles in said first strip-like zones, causing interaction along the boundaries between adjacent strip-like zones resulting in a random particle orientation and then stamping out a magnetic recording disc from the support film base, whereby positioning of a disc center hole is greatly fascilitated and the output is enhenced.

2. A method of producing a magnetic recording disc as defined in claim 1 wherein the width of each zone is not more than 3 mm.

3. A method of producing a magnetic recording disc as defined in claim 1 wherein said ratio of the widths of the zones is within the range of 1:2 to 2:1.

4. A method of producing a magnetic recording disc as defined in claim 1 wherein in said first strip-like zones the magnetic particles are oriented in the longitudinal direction of the zones.

5. A method of producing a magnetic recording disc as defined in claim 4 wherein said second strip-like zones the magnetic particles are oriented in the direction perpendicular to the longitudinal direction of the zones.

6. A magnetic recording disc comprising a circular support film base and a magnetic layer containing magnetic particles carried on a support film base wherein said magnetic layer includes a number of first strip-like zones in which the magnetic particles are oriented in a first direction and a number of second strip-like zones in which the magnetic particles are oriented in a second direction inclined with respect to the first direction at an angle of 60° to 120°, said first and second strip-like zones being alternately and contiguously arranged in parallel to each other, the width of each said first and second strip-like zone being not more than 5 mm and the ratio of the width of the first strip-like zone to that of the second strip-like zone being within the range of 1:3 to 3:1, the magentic particles at the boundaries formed between said first and second strip-like zones being randomly oriented with said particle orientation resulting in a disc exhibiting improved recording characteristics.

7. A magnetic recording disc as defined in claim 6 wherein the width of each zone is not more than 3 mm.

8. A magnetic recording disc as defined in claim 6 wherein said ratio of the widths of the zones is within the range of 1:2 to 2:1.

9. A magnetic recording disc as defined in claim 6 wherein in said first strip-like zones the magnetic particles are oriented in the longitudinal direction of the zones.

10. A magnetic recording disc as defined in claim 9 wherein said second strip-like zones the magnetic particles are oriented in the direction perpendicular to the longitudinal direction of the zones.

* * * * *